US008385726B2

(12) United States Patent
Kuno (10) Patent No.: US 8,385,726 B2
(45) Date of Patent: Feb. 26, 2013

(54) PLAYBACK APPARATUS AND PLAYBACK METHOD USING THE PLAYBACK APPARATUS

(75) Inventor: Shinji Kuno, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1327 days.

(21) Appl. No.: 11/657,960

(22) Filed: Jan. 25, 2007

(65) Prior Publication Data

US 2007/0223877 A1    Sep. 27, 2007

(30) Foreign Application Priority Data

Mar. 22, 2006   (JP) ................................ 2006-078219

(51) Int. Cl.
*H04N 5/89* (2006.01)
*H04N 5/92* (2006.01)
*H04N 5/76* (2006.01)
*G09G 5/02* (2006.01)
*G09G 5/00* (2006.01)

(52) U.S. Cl. ........ 386/335; 386/337; 386/341; 386/246; 386/201; 386/208; 386/232; 386/239; 386/248; 386/244; 386/243; 345/592; 345/594; 345/603; 345/604; 345/605; 345/589; 345/619; 345/636

(58) Field of Classification Search .................. 386/239, 386/248, 244, 243, 335, 337, 341, 246, 201, 386/208, 232; 348/598, 556; 345/592, 594, 345/603–605, 589, 619, 636
See application file for complete search history.

(56) References Cited

U.S. PATENT DOCUMENTS

| 5,027,212 | A |   | 6/1991  | Marlton et al. |
|-----------|---|---|---------|----------------|
| 5,809,245 | A |   | 9/1998  | Zenda |
| 5,890,190 | A |   | 3/1999  | Rutman |
| 5,912,710 | A | * | 6/1999  | Fujimoto ..................... 348/445 |
| 6,008,860 | A | * | 12/1999 | Patton et al. ................. 348/565 |
| 6,128,015 | A |   | 10/2000 | Zenda |

(Continued)

FOREIGN PATENT DOCUMENTS

| JP | 06-335022    | 2/1994 |
| JP | H07-236136 A | 9/1995 |

(Continued)

OTHER PUBLICATIONS

English Translation of Chinese Office Action dated May 9, 2008.

(Continued)

*Primary Examiner* — Helen Shibru
(74) *Attorney, Agent, or Firm* — Knobbe, Martens, Olson and Bear, LLP (57) ABSTRACT

A playback apparatus includes an output unit configured to output main video data used as a main image, sub-video data used as a subsidiary image, cursor data to display a cursor, graphics data to display operation guidance, and sub-picture data to display subtitles, a first blend processing unit configured to superimpose the sub-video data, the sub-picture data, the cursor data and the graphics data, and a second blend processing unit configured to superimpose the superimposed data obtained by the first blend processing unit and the main video data.

10 Claims, 7 Drawing Sheets

U.S. PATENT DOCUMENTS

| | | | |
|---|---|---|---|
| 6,230,209 B1 | 5/2001 | Zenda | |
| 6,311,204 B1 | 10/2001 | Mills | |
| 6,356,277 B1 | 3/2002 | Yajima et al. | |
| 6,377,309 B1 | 4/2002 | Ito et al. | |
| 6,463,208 B1 | 10/2002 | Kim | |
| 6,486,922 B1 | 11/2002 | Ueno | |
| 6,552,750 B1 | 4/2003 | Suen et al. | |
| 6,606,127 B1 | 8/2003 | Fang et al. | |
| 6,741,617 B2 | 5/2004 | Rosengren et al. | |
| 6,763,178 B1 | 7/2004 | Suzuki et al. | |
| 6,828,987 B2 | 12/2004 | Swan | |
| 6,903,753 B1* | 6/2005 | Gray et al. | 345/634 |
| 6,912,350 B1 | 6/2005 | Vasquez | |
| 6,947,485 B2 | 9/2005 | Owen et al. | |
| 6,987,518 B2 | 1/2006 | Dawson | |
| 7,035,531 B2 | 4/2006 | Tzou | |
| 7,068,324 B2 | 6/2006 | Englert | |
| 7,136,078 B2 | 11/2006 | Liao et al. | |
| 7,251,322 B2 | 7/2007 | Stokes, III et al. | |
| 7,365,757 B1 | 4/2008 | Callway et al. | |
| 7,400,360 B2* | 7/2008 | Linzer | 348/564 |
| 7,483,042 B1* | 1/2009 | Glen | 345/629 |
| 7,539,391 B2 | 5/2009 | Cavallerano et al. | |
| 7,554,608 B2* | 6/2009 | Kawamura | 348/584 |
| 7,728,851 B2* | 6/2010 | Kuno | 345/629 |
| 7,936,360 B2* | 5/2011 | Kuno | 345/629 |
| 7,973,806 B2 | 7/2011 | Kuno | |
| 2002/0067418 A1* | 6/2002 | I | 348/333.01 |
| 2002/0172496 A1* | 11/2002 | Gunji et al. | 386/46 |
| 2003/0194213 A1 | 10/2003 | Schultz et al. | |
| 2004/0001402 A1 | 1/2004 | Hora | |
| 2004/0049781 A1* | 3/2004 | Flesch et al. | 725/37 |
| 2004/0113929 A1* | 6/2004 | Matsuzaki | 345/700 |
| 2004/0120695 A1* | 6/2004 | Tsumagari et al. | 386/109 |
| 2004/0207755 A1 | 10/2004 | Lin | |
| 2004/0233215 A1 | 11/2004 | Dawson | |
| 2005/0062889 A1* | 3/2005 | Linzer | 348/554 |
| 2005/0122341 A1 | 6/2005 | MacInnis | |
| 2005/0140695 A1 | 6/2005 | Dunton et al. | |
| 2005/0185928 A1 | 8/2005 | Kang et al. | |
| 2005/0265609 A1* | 12/2005 | Morishige | 382/235 |
| 2005/0265688 A1* | 12/2005 | Kobayashi | 386/46 |
| 2005/0281342 A1 | 12/2005 | Aggarwal et al. | |
| 2006/0056810 A1* | 3/2006 | Kelly et al. | 386/95 |
| 2006/0127051 A1* | 6/2006 | Tsumagari et al. | 386/95 |
| 2006/0164437 A1* | 7/2006 | Kuno | 345/629 |
| 2006/0164438 A1* | 7/2006 | Kuno | 345/629 |
| 2006/0164938 A1* | 7/2006 | Kuno | 369/47.1 |
| 2006/0176312 A1* | 8/2006 | Kuno | 345/589 |
| 2006/0188229 A1* | 8/2006 | Yamagata et al. | 386/95 |
| 2006/0221231 A1* | 10/2006 | Palgrave-Moore et al. | 348/441 |
| 2007/0098354 A1* | 5/2007 | Ando et al. | 386/46 |
| 2007/0222798 A1* | 9/2007 | Kuno | 345/634 |
| 2007/0223877 A1* | 9/2007 | Kuno | 386/95 |
| 2008/0043140 A1* | 2/2008 | Herpel et al. | 348/404.1 |
| 2008/0285948 A1* | 11/2008 | Iwase et al. | 386/95 |

FOREIGN PATENT DOCUMENTS

| | | |
|---|---|---|
| JP | 07-298139 | 11/1995 |
| JP | 08-065512 | 3/1996 |
| JP | 8-205092 | 8/1996 |
| JP | 08-205092 | 8/1996 |
| JP | H09-046722 A | 2/1997 |
| JP | 10-145780 | 5/1998 |
| JP | 10-320922 | 12/1998 |
| JP | 11-053580 | 2/1999 |
| JP | H11-168701 A | 6/1999 |
| JP | 11-203444 | 7/1999 |
| JP | 2000-305546 | 2/2000 |
| JP | 2000-194354 | 7/2000 |
| JP | 2000-194354 A | 7/2000 |
| JP | 2000-324419 A | 11/2000 |
| JP | 2001-053956 A | 2/2001 |
| JP | 2001-320673 A | 11/2001 |
| JP | 2002-199277 A | 7/2002 |
| JP | 2002-247498 A | 8/2002 |
| JP | 2002-297198 | 10/2002 |
| JP | 2002-325171 | 11/2002 |
| JP | 2002-335497 | 11/2002 |
| JP | 2002-335497 A | 11/2002 |
| JP | 2003-162276 A | 6/2003 |
| JP | 2003-179850 A | 6/2003 |
| JP | 2003-224862 | 8/2003 |
| JP | 2003-259213 | 9/2003 |
| JP | 2003-259213 A | 9/2003 |
| JP | 2003-283710 | 10/2003 |
| JP | 2004-328226 A | 11/2004 |
| JP | 2004-328718 A | 11/2004 |
| JP | 2006-065365 | 3/2006 |
| WO | WO 2004/049710 A1 | 6/2004 |
| WO | WO 2004/090860 | 10/2004 |

OTHER PUBLICATIONS

English Translation of Final Notice of Rejection mailed by the Japan Patent Office on Mar. 9, 2010 for Japanese Patent Application No. 2006-078219.

An English Translation of Notice of Reasons for Rejection mailed by the Japanese Patent Office on Dec. 15, 2009 for Japanese Patent Application 2006-078219.

Decision of Rejection mailed by the Japanese Patent Office for Japanese Patent Application 2005-000247, on Jan. 26, 2010.

Final Notice of Rejection mailed by the Japan Patent office for Japanese Patent Application No. 2005-000246 on Sep. 8, 2009.

Final Notice of Rejection mailed by the Japan Patent office for Japanese Patent Application No. 2005-000247 on Sep. 8, 2009.

Notice of Reasons for Rejection mailed by Japan Patent Office for Japanese Patent Application No. 2005-000250, on Jan. 25, 2011.

Notice of Reasons for Rejection mailed by the Japan Patent Office for Japanese Patent Application No. 2005-000248 on Aug. 18, 2009.

Notification of Reasons for Rejection mailed by Japan Patent Office for Japanese Patent Application No. 2005-000246 on May 26, 2009.

Notification of Reasons for Rejection mailed by Japan Patent Office for Japanese Patent Application No. 2005-000247 on May 12, 2009.

Notification of Reasons for Rejection mailed by Japan Patent Office for Japanese Patent Application No. 2005-000248 on May 12, 2009.

Notification of Reasons for Rejection mailed on May 8, 2012 in a corresponding Japanese Patent Application No. JP 2010-200113.

Final Notice of Rejection mailed on Jul. 10, 2012 in corresponding Japanese Appl. No. 2010-200113.

* cited by examiner

PLAYBACK APPARATUS AND PLAYBACK METHOD USING THE PLAYBACK APPARATUS

CROSS-REFERENCE TO RELATED APPLICATIONS

This application is based upon and claims the benefit of priority from Japanese Patent Application No. 2006-078219, filed Mar. 22, 2006, the entire contents of which are incorporated herein by reference.

BACKGROUND

1. Field

One embodiment of the invention relates to a playback apparatus such as an HD DVD (High Definition Digital Versatile Disc) player, and a playback method using the playback apparatus.

2. Description of the Related Art

Recently, with development of digital compression encoding technique of moving images, playback apparatuses (players) which can deal with high-definition images of HD (High Definition) standard have been developed.

Players of this type are required to have functions for merging a plurality of image data items at a high order to enhance interactive property.

For example, Jpn. Pat. Appln. KOKAI Pub. No. 8-205092 discloses a system which combines graphics data with video data by a display controller. In the system, the display controller captures video data, and combines the captured video data with part of area on a graphics picture.

In the meantime, in conventional systems including the system disclosed in Jpn. Pat. Appln. KOKAI Pub. No. 8-205092 are predicated on dealing with video data of a relatively low definition, and not intended to deal with high-definition images such as video data of the HD standard. Further, they are not intended to superimpose many image data items.

On the other hand, in the HD standard, it is required to superimpose five image data items at the maximum, and the required processing amount exceeds the actual processing power of playback apparatuses. Therefore, proper distribution and increased efficiency of processing in view of load are strongly required.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a playback apparatus includes an output unit configured to output main video data used as a main image, sub-video data used as a subsidiary image, cursor data to display a cursor, graphics data to display operation guidance, and sub-picture data to display subtitles, a first blend processing unit configured to superimpose the sub-video data, the sub-picture data, the cursor data and the graphics data, and a second blend processing unit configured to superimpose the superimposed data obtained by the first blend processing unit and the main video data.

Figure 1:
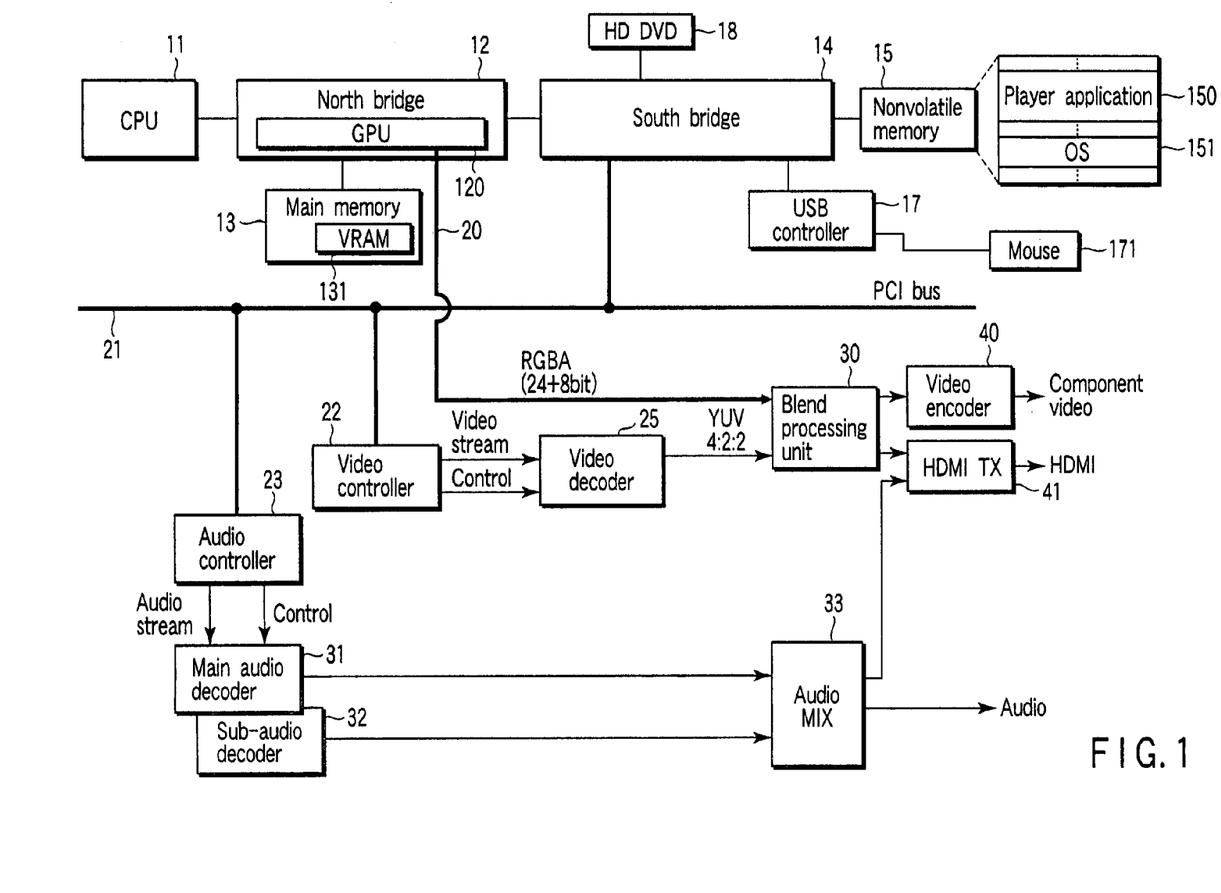
FIG. 1 is an exemplary block diagram illustrating a structure of a playback apparatus according to an embodiment of the present invention.

FIG. 1 illustrates an example of a structure of a playback apparatus according to an embodiment of the present invention. The playback apparatus is a media player which plays back audio video (AV) content. The playback apparatus is realized as an HD DVD player which plays back audio video (AV) content stored in a DVD medium of HD DVD (High Definition Digital Versatile Disc) standard.

As shown in FIG. 1, the HD DVD player comprises a CPU (Central Processing Unit) 11, a north bridge 12, a main memory 13, a south bridge 14, a nonvolatile memory 15, a USB (Universal Serial Bus) controller 17, an HD DVD drive 18, a graphics bus 20, a PCI (Peripheral Component Interconnect) bus 21, a video controller 22, an audio controller 23, a video decoder 25, a blend processing unit 30, a main audio decoder 31, a sub-audio decoder 32, an audio mixer (Audio Mix) 33, a video encoder 40, and an AV interface (HDMI-TX) 41 such as an HDMI (High Definition Multimedia Interface).

In the HD DVD player, a player application 150 and an operating system (OS) 151 are installed in advance in the nonvolatile memory 15. The player application 150 is software operating on the OS 151, and performs control to play back AV content read by the HD DVD drive 18.

AV content stored in a storage medium, such as an HD DVD medium, driven by the HD DVD drive 18 comprises compressed and encoded main video data, compressed and encoded main audio data, compressed and encoded sub-video data, compressed and encoded sub-picture data, graphic data containing alpha data, compressed and encoded sub-audio data, and navigation data which controls playback of the AV content.

The compressed and encoded main video data is data obtained by compressing and encoding moving image data, to be used as main images (main picture images) with compression encoding method of the H.264/AVC standard. The main video data comprises high-definition images of the HD standard. Video data of the SD (Standard Definition) standard may be used as the main video data. The compressed and encoded main audio data is audio data associated with the main video data. The main audio data is played back in synchronization with playback of the main video data.

The compressed and encoded sub-video data is formed of subsidiary images (sub-picture images) displayed in a state of being superimposed on the main video images, and comprises moving images (for example, images of an interview scene of a director of a movie serving as the main video image) which supplement the main video data. The compressed and encoded sub-audio data is audio data associated with the sub-video data. The sub-audio data is played back in synchronization with playback of the sub-video data.

The graphics data is also formed of subsidiary images (sub-picture images) displayed in a state of being superimposed on the main video images, and comprises various data (Advanced Elements) for displaying operation guidance such as menu objects. Each of the advanced elements is formed of still images, moving images (including animation), and texts. The player application 150 has a drawing function for drawing pictures in accordance with mouse operations by the user. Images drawn by the drawing function are also used as graphics data, and can be displayed in a state of being superimposed on the main video images.

The compressed and encoded sub-picture data is formed of texts such as subtitles.

The navigation data includes a play list for controlling the playback order of the content, and a script for controlling playback of the sub-video data and graphics (advanced elements). The script is described by a markup language such as XML.

The main video data of the HD standard has a resolution of 1920×1080 pixels, or 1280×720 pixels. Further, each of the sub-video data, the sub-picture data, and the graphics data has a resolution of, for example, 720×480 pixels.

In the HD DVD player, the software (the player application 150) performs a separation processing and a decoding processing. In the separation processing, the main video data, the main audio data, the sub-video data, the sub-audio data, and the sub-picture data are separated from an HD DVD stream read by the HD DVD drive 18. In the decoding processing, the sub-video data, the sub-picture data, and the graphics data are decoded. On the other hand, the hardware performs processing requiring much processing amount, that is, processing of decoding the main video data, and decoding processing of decoding the main audio data and the sub-audio data.

The CPU 11 is a processor provided to control operation of the HD DVD players. The CPU 11 executes the OS 151 and the player application 150 that are loaded from the nonvolatile memory 15 to the main memory 13. A part of a storage area in the main memory 13 is used as a video memory (VRAM) 131. However, it is not indispensable to use a part of the storage area in the main memory 13 as the VRAM 131. A dedicated memory device independent of the main memory 13 may be used as the VRAM 131.

The north bridge 12 is a bridge device that connects a local bus of the CPU 11 with the south bridge 14. The north bridge 12 includes a memory controller which performs access control of the main memory 13. Further, the north bridge 12 also includes a GPU 120 (Graphics Control Unit) 120.

The GPU 120 is a graphics controller that generates a graphics signal, which forms a graphics picture image, from data written by the CPU 11 in the video memory (VRAM) 131 being a part of the storage area of the main memory 13. The GPU 120 generates a graphics signal by using a graphics computing function such as bit block transfer. For example, suppose that the CPU 11 writes image data items (sub-video, sub-picture, graphics, and cursor) in four respective planes on the VRAM 131. The GPU 120 executes, by using bit block transfer, blend processing to superimpose the image data items of the four planes pixel by pixel, and thereby generates a graphics signal to form a graphics picture image having the same resolution (for example, 1920×1080 pixels) of that of the main video. The blend processing is executed by using respective alpha data items corresponding to the sub-video, the sub-picture, and the graphics. Alpha data is a coefficient indicating transparency (or opacity) of each pixel of the image data corresponding to the alpha data. The respective alpha data items corresponding to the sub-video, the sub-picture, and the graphics are stored in the HD DVD medium together with the respective image data items of the sub-video, the sub-picture, and the graphics. Specifically, each of the sub-video, the sub-picture, and the graphics is formed of image data and alpha data.

A graphics signal generated by the GPU 120 has an RGB color space. Each pixel of a graphics signal is expressed by digital RGB data (24 bits).

Besides generating a graphics signal forming a graphic picture image, the GPU 120 also has a function of outputting alpha data corresponding to the generated graphics signal to the outside.

Specifically, the GPU 120 outputs a generated graphics signal to the outside as a digital RGB video signal, and also outputs alpha data corresponding to the generated graphics signal to the outside. The alpha data is a coefficient (8 bits) indicating transparency (or opacity) of each pixel of the generated graphics signal (RGB data). The GPU 120 outputs, for each pixel, graphics output data with alpha data (RGBA data of 32 bits), formed of a graphics signal (a digital RGB video signal of 24 bits) and alpha data (8 bits). The graphics output data with alpha data (RGBA data of 32 bits) is sent to the blend processing unit 30 through the dedicated graphics bus 20. The graphics bus 20 is a transmission line that connects the GPU 120 with the blend processing unit 30.

As described above, in the HD DVD player, graphics output data with alpha data is directly transmitted from the GPU 120 to the blend processing unit 30 through the graphics bus 20. This makes unnecessary to transmit alpha data from the VRAM 131 to the blend processing unit 30 by using the PCI bus 21 or the like, and therefore prevents increase in the traffic of the PCI bus 21 due to transmission of alpha data.

If alpha data is transmitted from the VRAM 131 to the blend processing unit 30 through the PCI bus 21 or the like, it is required to synchronize the graphics signal output from the GPU 120 and alpha data transmitted through the PCI bus 21, and thereby the structure of the blend processing unit 30 is complicated. In the HD DVD player of the present invention, the GPU 120 outputs graphics signals and the alpha data in synchronization with each other pixel by pixel. Therefore, synchronization between graphics signals and alpha data is easily achieved.

The south bridge 14 controls the devices arranged on the PCI bus 21. The south bridge 14 includes an IDE (Integrated Drive Electronics) controller to control the HD DVD drive 18. The south bridge 14 also has a function of controlling the nonvolatile memory 15 and the USB controller 17. The USB controller 17 controls a mouse device 171. The user can select a menu item and the like by operating the mouse device 171. A remote control unit may be used instead of the mouse device 171 as a matter of course.

The HD DVD drive 18 is a drive unit to drive storage media, such as HD DVD media storing audio video (AV) content compliant with the HD DVD standard.

The video controller 22 is connected to the PCI bus 21. The video controller 22 is an LSI that interfaces with the video decoder 25. A stream (Video Stream) of main video data separated from an HD DVD stream by the software is transmitted to the video decoder 25 through the PCI bus 21 and the video controller 22. Further, decode control information (Control) output from the CPU 11 is also transmitted to the video decoder 25 through the PCI bus 21 and the video controller 22.

The video decoder 25 is a decoder compliant with the H.264/AVC standard. The video decoder 25 decodes main video data of the HD standard and generates a digital YUV video signal that forms a video picture image with a resolution of, for example, 1920×1080 pixels. The digital YUV video signal is transmitted to the blend processing unit 30.

The blend processing unit 30 is connected to the GPU 120 and the video decoder 25, and executes blend processing to superimpose graphics output data output from the GPU 120 and main video data decoded by the video decoder 25. In the blend processing, blend processing (alpha blending processing) is performed to superimpose a digital RGB video signal forming graphics data and a digital YUV video signal forming main video data pixel by pixel, on the basis of alpha data output from the GPU 120 together with the graphics data (RGB). In the processing, the main video data is used as an underside picture image, and the graphics data is used as a top picture image superimposed on the main video data.

Output image data obtained by blending processing is supplied to each of the video encoder 40 and the AV interface (HDMI-TX) 41, as a digital YUV video signal, for example. The video encoder 40 converts output image data (digital YUV video signal) obtained by blend processing into a component video signal or an S-video signal, and outputs it to an external display device (monitor) such as a television set. The AV interface (HDMI-TX) 41 outputs a set of digital signals containing the digital YUV video signal and a digital audio signal to an external HDMI device.

The audio controller 23 is connected to the PCI bus 21. The audio controller 23 is an LSI that interfaces with each of the main audio decoder 31 and the sub-audio decoder 32. A main audio data stream separated from an HD DVD stream by the software is transmitted to the main audio decoder 31 through the PCI bus 21 and the audio controller 23. Further, a sub-audio data stream separated from an HD DVD stream by the software is transmitted to the sub-audio decoder 32 through the PCI bus 21 and the audio controller 23. Decoding control information (Control) output from the CPU 11 is also supplied to each of the main audio decoder 31 and the sub-audio decoder 32 through the video controller 22.

The main audio decoder 31 generates a digital audio signal of I2S (Inter-IC Sound) format by decoding main audio data. The digital audio signal is transmitted to the audio mixer (Audio Mix) 33. The main audio data is compressed and encoded by using any one of a plurality of types of predetermined compression encoding methods (that is, a plurality of types of audio codecs). Therefore, the main audio decoder 31 has decoding functions compliant with the respective compression encoding methods. Specifically, the main audio decoder 31 generates a digital audio signal by decoding main audio data compressed and encoded with one of the compression encoding methods. The main audio decoder 31 is notified of the type of the compression encoding method used for the main audio data, by the decoding control information from the CPU 11.

The sub-audio decoder 32 generates a digital audio signal of the I2S (Inter-IC Sound) format by decoding sub-audio data. The digital audio data is transmitted to the audio mixer (Audio Mix) 33. The sub-audio data is also compressed and encoded by using any one of the above predetermined compression encoding methods (that is, a plurality of types of audio codecs). Therefore, the sub-audio decoder 32 also has decoding functions compliant with the respective compression encoding methods. Specifically, the sub-audio decoder 32 generates a digital audio signal by decoding sub-audio data compressed and encoded with one of the compression encoding methods. The sub-audio decoder 32 is notified of the type of the compression encoding method used for the sub-audio data, by the decoding control information from the CPU 11.

The audio mixer (Audio Mix) 33 generates a digital audio output signal, by executing mixing processing to mix main audio data decoded by the main audio decoder 31 with sub-audio data decoded by the sub-audio decoder 32. The digital audio output signal is transmitted to the AV interface (HDMI-TX) 41, and output to the outside after being converted into an analogue audio output signal.

Figure 2:
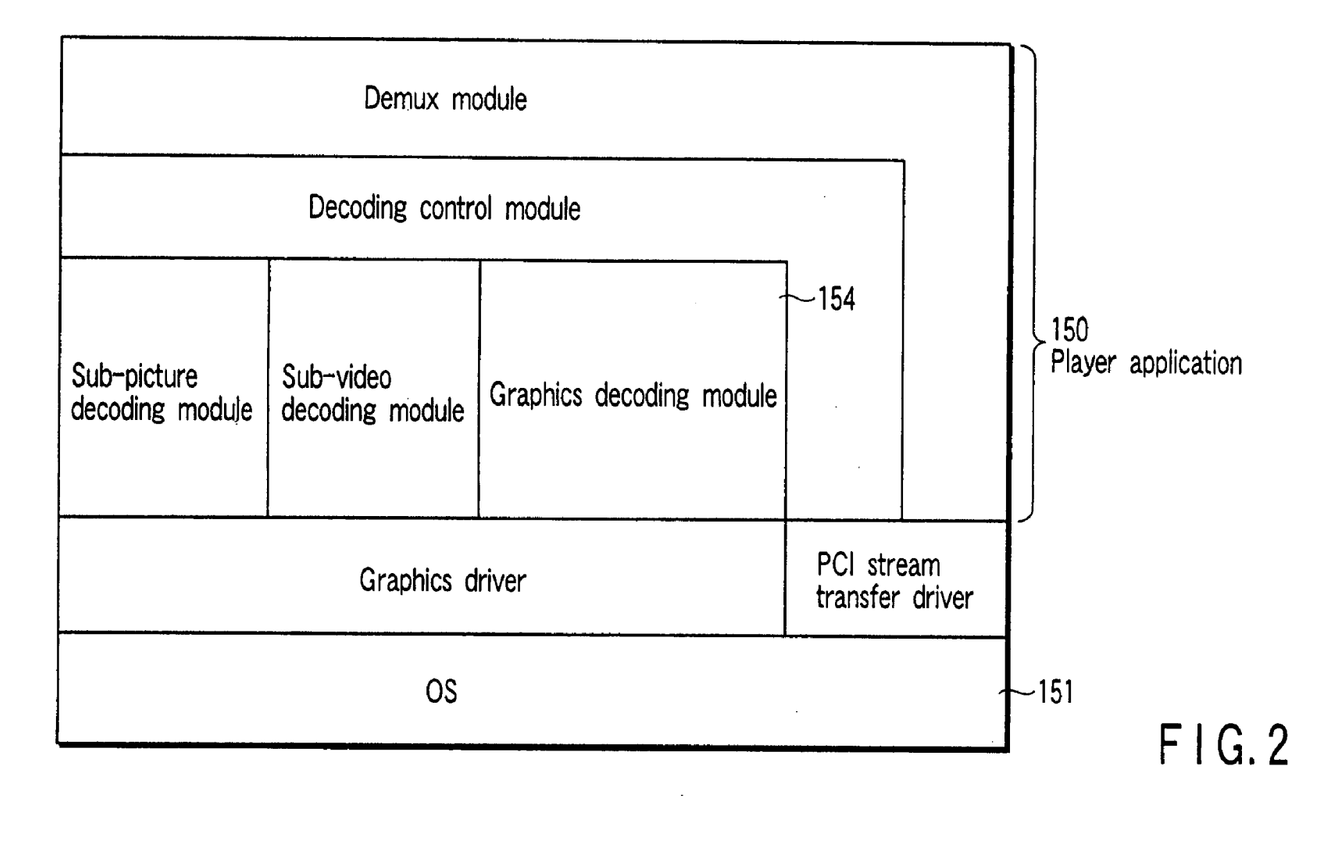
FIG. 2 is an exemplary diagram illustrating a structure of a player application used in the playback apparatus of FIG. 1.

Next, a function and a structure of the player application 150 executed by the CPU 11 are explained with reference to FIG. 2.

The player application 150 comprises a demultiplex (Demux) module, a decoding control module, a Sub-picture decoding module, a sub-video decoding module, and a graphics decoding module.

The Demux module is software which executes demultiplex processing to separate main video data, main audio data, sub-picture data, sub-video data, and sub-audio data from a stream read by the HD DVD drive 18. The decoding control module is software which controls decoding processing of each of main video data, main audio data, sub-picture data, sub-video data, sub-audio data, and graphics data on the basis of navigation data.

The sub-picture decoding module decodes sub-picture data. The sub-video decoding module decodes sub-video data. The graphics decode module decodes graphics data (Advanced Elements).

A graphics driver is software to control the GPU 120. Decoded sub-picture data, decoded sub-video data, and decoded graphics data are transmitted to the GPU 120 through the graphics driver. Further, the graphics driver issues various drawing commands to the GPU 120.

A PCI stream transfer driver is software to transfer a stream through the PCI bus 21. Main video data, main audio data, and sub-audio data are transmitted to the video decoder 25, the main audio decoder 31, and the sub-audio decoder 32, respectively, through the PCI bus 21 by the PCI stream transfer driver.

Next, a function and a structure of a software decoder realized by the player application 150 executed by the CPU 11 are explained with reference to FIG. 3.

Figure 3:
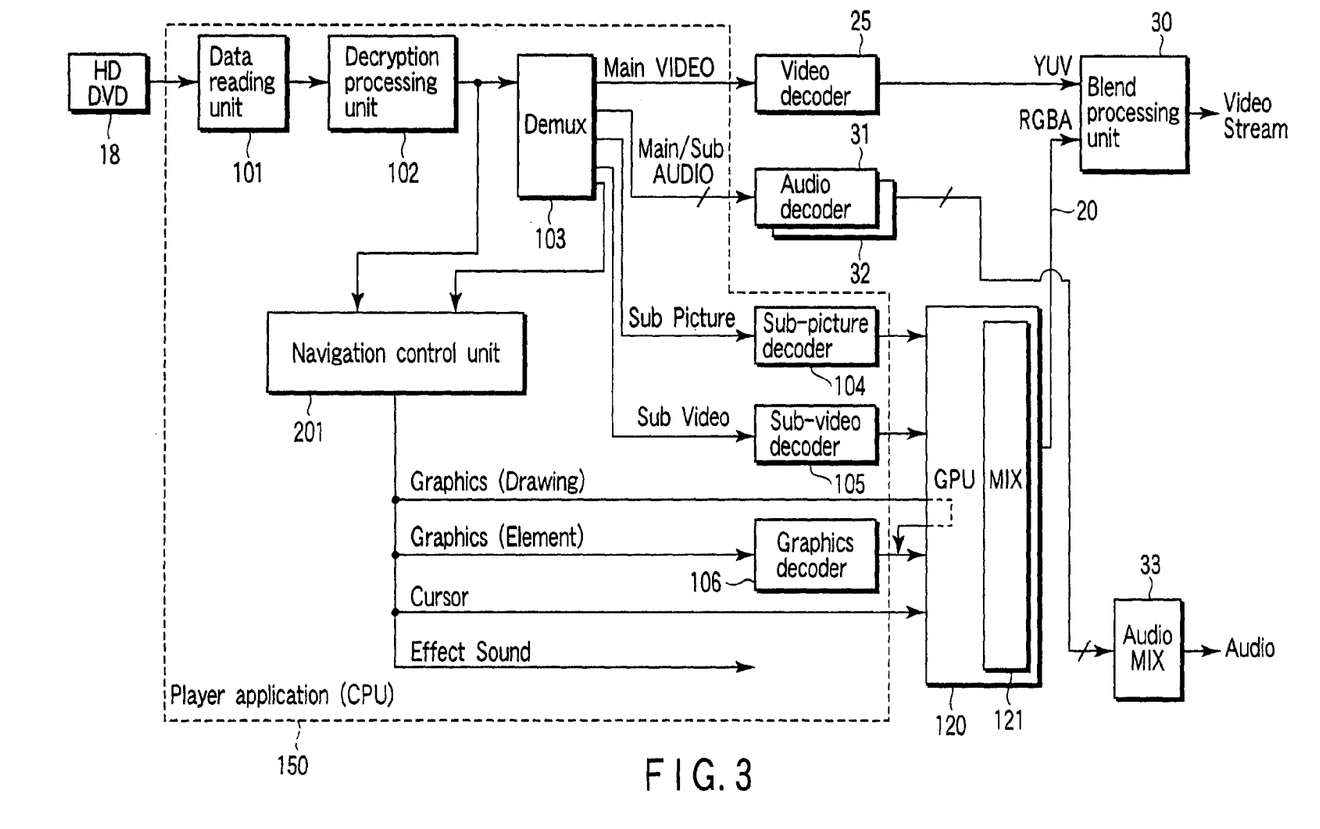
FIG. 3 is an exemplary diagram illustrating a function and a structure of a software decoder realized by the player application of FIG. 2.

As shown in FIG. 3, the software decoder comprises a data reading unit 101, a decryption processing unit 102, a demultiplex unit (Demux) 103, a sub-picture decoder 104, a sub-video decoder 105, a graphics decoder 106, and a navigation control unit 201.

Content (main video data, sub-video data, sub-picture data, main audio data, sub-audio data, graphics data, and navigation data) stored in an HD DVD medium in the HD DVD 18 is read from the HD DVD drive 18 by the data reading unit 101. Each of the main video data, the sub-video data, the sub-picture data, the main audio data, the sub-audio data, the graphics data, and the navigation data is encrypted. The main video data, the sub-video data, the sub-picture data, the main audio data, and the sub-audio data are superimposed on an HD DVD stream. Each of the main video data, the sub-video data, the sub-picture data, the main audio data, the sub-audio data, the graphics data, and the navigation data read from the HD DVD medium by the data reading unit 101 is input to the content decryption processing unit 102. The decryption processing unit 102 executes processing to decrypt each of the encrypted data items. The decrypted navigation data is transmitted to the navigation control unit 201. Further, the decrypted HD DVD stream is transmitted to the Demux 103.

The navigation control unit 201 analyses a script (XML) included in the navigation data, and controls playback of the graphics data (Advanced Elements). The graphics data (Advanced Elements) is transmitted to the graphics decoder 106. The graphics decoder 106 is formed of the graphics decoding module of the player application 150, and decodes the graphics data (Advanced Elements).

Further, the navigation control unit 201 also executes processing to move the cursor in response to the operation of the mouse device 171 by the user, and processing to play back sound effects in response to selection of a menu item. Drawing of an image by the above drawing function is achieved by the following: the navigation control unit 201 receives user's operation of the mouse device 171, causes the GPU 120 to generate graphics data of a picture formed by the path, that is, the cursor path, and thereafter input the data again to the GPU 120 as graphics data equivalent to graphics data decoded by the graphics decoder 106 by using navigation data.

The Demux 103 is realized by the Demux module of the player application 150. The Demux 103 separates the main video data, the main audio data, the sub-audio data, the sub-picture data, and the sub-video data from the HD DVD stream.

The main video data is transmitted to the video decoder 25 through the PCI bus 21. The main video data is decoded by the video decoder 25. The decoded main video data has a resolution of, for example, 1920×1080 pixels of the HD standard, and is transmitted as a digital YUV video signal to the blend processing unit 30.

The main audio data is transmitted to the main audio decoder 31 through the PCI bus 21. The main audio data is decoded by the main audio decoder 31. The decoded main audio data is transmitted as a digital audio signal of I2S format to the audio mixer 33.

The sub-audio data is transmitted to the sub-audio decoder 32 through the PCI bus 21. The sub-audio data is decoded by the sub-audio decoder 32. The decoded sub-audio data is transmitted as a digital audio signal of I2S format to the audio mixer 33.

The sub-picture data and the sub-video data are transmitted to the sub-picture decoder 104 and the sub-video decoder 105, respectively. The sub-picture decoder 104 and the sub-video decoder 105 decode the sub-picture data and the sub-video data, respectively. The sub-picture decoder 104 and the sub-video decoder 105 are achieved by the sub-picture decoding module and the sub-video decoding module of the player application 150, respectively.

The sub-picture data, the sub-video data, and the graphics data decoded by the sub-picture decoder 104, the sub-video decoder 105, and the graphics decoder 106, respectively, are written in the VRAM 131 by the CPU 11. Further, cursor data corresponding to a cursor image is also written in the VRAM 131 by the CPU 11. Each of the sub-picture data, the sub-video data, the graphics data, and the cursor data includes RGB data and alpha data (A) for each pixel.

The GPU 120 generates graphics output data, which forms a graphics picture image of 1920×1080 pixels, from the sub-video data, the graphics data, the sub-picture data, and the cursor data written in the VRAM 131 by the CPU 11. The sub-video data, the graphics data, the sub-picture data and the cursor data are superimposed pixel by pixel, by alpha blending processing executed by the mixer unit (MIX) 121 of the GPU 120.

In the alpha blending processing, respective alpha data items corresponding to the sub-video data, the graphics data, the sub-picture data, and the cursor data written in the VRAM 131 are used. Specifically, each of the sub-video data, the graphics data, the sub-picture data, and the cursor data written in the VRAM 131 comprises image data and alpha data. The MIX 121 executes blend processing on the basis of the respective alpha data items corresponding to the sub-video data, the graphics data, the sub-picture data and the cursor data, and respective position information items of the sub-video data, the graphics data, the sub-picture data and the cursor data designated by the CPU 11. Thereby, the MIX 121 generates a graphics picture image in which the sub-video data, the graphics data, the sub-picture data, and the cursor data are superimposed on a background image of 1920×1080 pixels.

An alpha value of each pixel of the background image is a value indicating the pixel is transparent, that is, 0. In the graphics picture image, for areas in which image data items are superimposed, new alpha data items corresponding to the respective areas are calculated by the MIX 121.

As described above, the GPU 120 generates graphics output data (RGB), which forms a graphics picture image of 1920×1080 pixels, and alpha data corresponding to the graphics data, from the sub-video data, the graphics data, the sub-picture data, and the cursor data. When only one image of the sub-video data, the graphics data, the sub-picture data, and the cursor data is displayed, the GPU 120 generates graphics data corresponding to a graphics picture image, in which only the image (for example, 720×480) is disposed on a background image of 1920×1080 pixels, and generates alpha data corresponding to the graphics data.

The graphics data (RGB) and the alpha data generated by the GPU 120 are transmitted as RGBA data to the blend processing unit 30 through the graphics bus 20.

Figure 4:
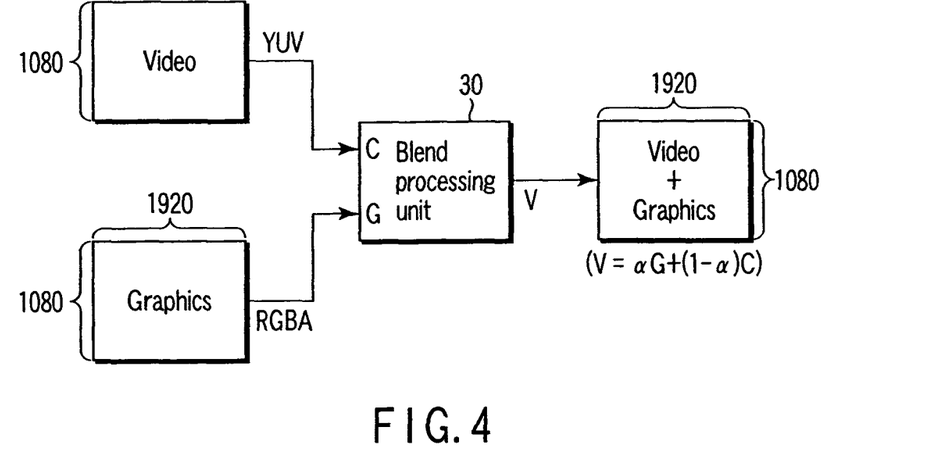
FIG. 4 is an exemplary diagram illustrating blend processing executed by a blend processing unit provided in the playback apparatus of FIG. 1.

Next, the blend processing (alpha blending processing) executed by the blend processing unit 30 is explained with reference to FIG. 4.

Alpha blending processing is a blend processing in which graphics data and main video data are superimposed pixel by pixel, on the basis of alpha data (A) accompanying the graphics data (RGB). The graphics data (RGB) is used as an oversurface image, and superimposed on the video data. A resolution of graphics data output from the GPU 120 is the same as a resolution of main video data output from the video decoder 25.

Suppose that main video data (Video) having a resolution of 1920×1080 pixels is input to the blend processing unit 30 as image data C, and graphics data having a resolution of 1920×1080 pixels is input to the blend processing unit 30 as image data G. The blend processing unit 30 executes computation to superimpose the image data G on the image data C pixel by pixel on the basis of alpha data (A) having a resolution of 1920×1080 pixels. This computation is executed by the following formula (1).

$$V = \alpha \times G + (1-\alpha)C \qquad (1)$$

V denotes a color of each pixel of output image data obtained by alpha blending processing, and a denotes an alpha value corresponding to each pixel of the graphics data G.

Figure 5:
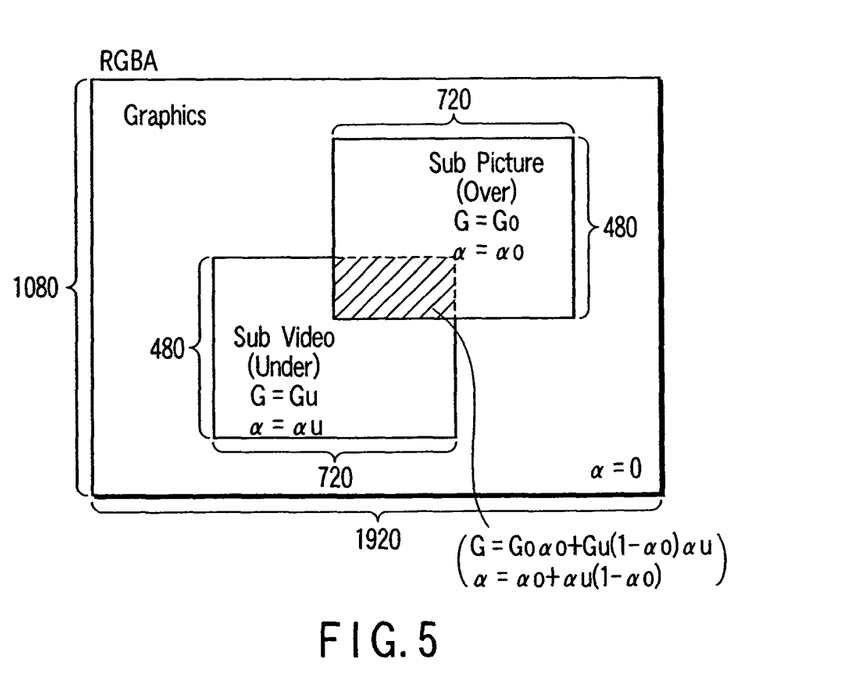
FIG. 5 is an exemplary diagram illustrating blend processing executed by a GPU provided in the playback apparatus of FIG. 1.

Next, the blending processing (alpha blending processing) executed by the MIX 121 of the GPU 120 is explained with reference to FIG. 5.

In this embodiment, suppose that graphics data having a resolution of 1920×1080 pixels is generated from sub-picture data and sub-video data written in the VRAM 131. Each of the sub-picture data and the sub-video data has a resolution of, for example, 720×480 pixels. Each of the sub-picture data and the sub-video data is accompanied with alpha data having a resolution of 720×480 pixels.

For example, an image corresponding to the sub-picture data is used as an oversurface image, and an image corresponding to the sub-video data is used as an underface image.

A color of each pixel in an area where the image corresponding to the sub-picture data is superimposed on the image corresponding to the sub-video data is determined by the following formula (2).

$$G = Go \times \alpha o + Gu(1-\alpha o)\alpha u \quad (2)$$

G denotes a color of each pixel in the superimposed area, Go denotes a color of each pixel of the sub-picture data used as the oversurface image, αo denotes an alpha value of each pixel of the sub-picture data used as the oversurface image, and Gu denotes a color of each pixel of the sub-video data used as an underface image.

Further, an alpha value of each pixel in an area where the image corresponding to the sub-picture data is superimposed on the image corresponding to the sub-video data is determined by the following formula (3).

$$\alpha = \alpha o + \alpha u \times (1-\alpha o) \quad (3)$$

α denotes an alpha value of each pixel of the superimposed area, and αu denotes an alpha value of each pixel of sub-video data used as an undersurface.

As described above, the MIX 121 of the GPU 120 superimposes sub-picture data and sub-video data, by using alpha data of data used as an oversurface image, among the alpha data corresponding to the sub-picture data and alpha data corresponding to the sub-video data, and thereby generates graphics data that forms a picture image of 1920×1080 pixels. Further, the MIX 121 of the GPU 120 calculates an alpha value of each pixel of the graphics data forming a picture image of 1920×1080 pixels, on the basis of the alpha data corresponding to the sub-picture data and the alpha data corresponding to the sub-video data.

Specifically, the MIX 121 of the GPU 120 executes blend processing of superimposing a surface (color of pixels=black, alpha value of pixels=0) of 1920×1080 pixels, a surface of sub-video data of 720×480 pixels, and a surface of sub-picture data of 720×480 pixels, and thereby calculates graphics data forming a picture image of 1920×1080 pixels and alpha data of 1920×1080 pixels. The surface of 1920×1080 pixels is used as an undermost surface, the surface of the sub-video data is used as a second lowest surface, and the surface of the sub-picture data is used as an uppermost surface.

In the picture image of 1920×1080 pixels, the color of pixels in an area where neither of sub-picture data or sub-video data exists is black. Further, colors of pixels in an area where only sub-picture data exists are the same as respective original colors of corresponding pixels of the sub-picture data. In the same manner, colors of pixels in an area where only sub-video data exists are the same as respective original colors of corresponding pixels of the sub-picture data.

Further, in the picture image of 1920×1080 pixels, an alpha value corresponding to pixels in an area where neither of sub-picture data and sub-video data exists is 0. An alpha value of pixels in an area where only sub-picture data exists is the same as an original alpha value of corresponding pixels of the sub-picture data. In the same manner, an alpha value of pixels of an area where only sub-video data exists is the same as an original alpha value of corresponding pixels of the sub-video data.

Figure 6:
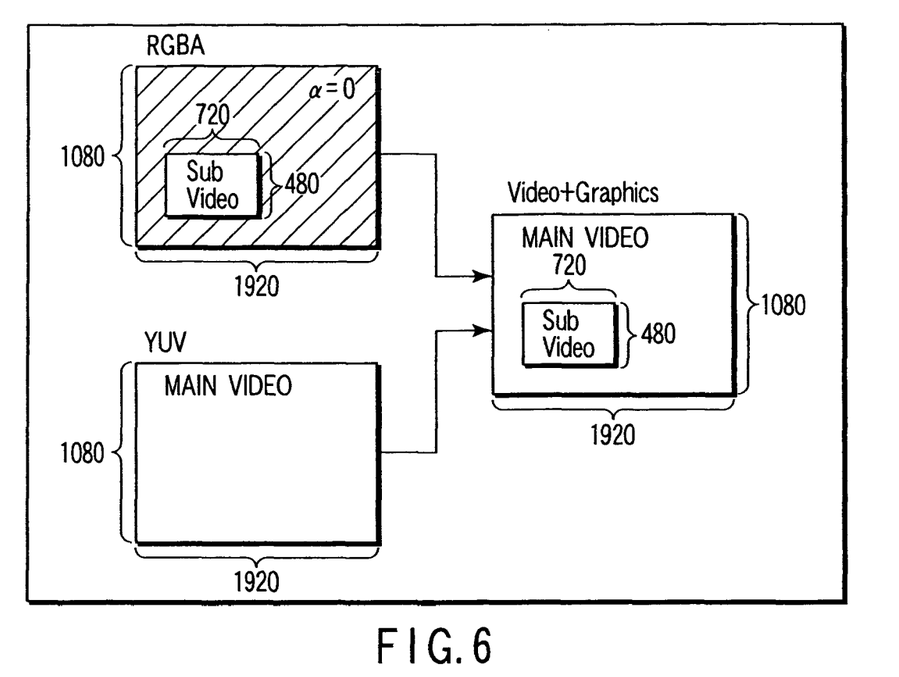
FIG. 6 is an exemplary diagram illustrating a state where sub video data is displayed in a state of being superimposed on main video data in the playback apparatus of FIG. 1.

FIG. 6 illustrates a state where sub-video data of 720×480 pixels is displayed in a state of being superimposed on main video data of 1920×1080 pixels.

In FIG. 6, graphics data is generated by blending processing of superimposing a surface of 1920×1080 pixels (color of pixels=black, alpha value of pixels=0) and a surface of sub-video data of 720×480 pixels pixel by pixel.

As described above, output picture data (Video+Graphics) output to the display device is generated by blending graphics data with main video data.

In graphics data of 1920×1080 pixels, an alpha value of pixels in an area where sub video data of 720×480 pixels does not exist is 0. Therefore, the area where sub-video data does not exist is transparent, and the main video data with an opacity of 100% is displayed in the area.

Each pixel of the sub-video data of 720×480 pixels is displayed, with a transparency designated by the alpha data corresponding to the sub-video data, on the main video data. For example, pixels of sub-video data having an alpha value of 1 is displayed with an opacity of 100%, and pixels of main video data corresponding to the pixel positions of the sub-video data are not displayed.

Figure 7:
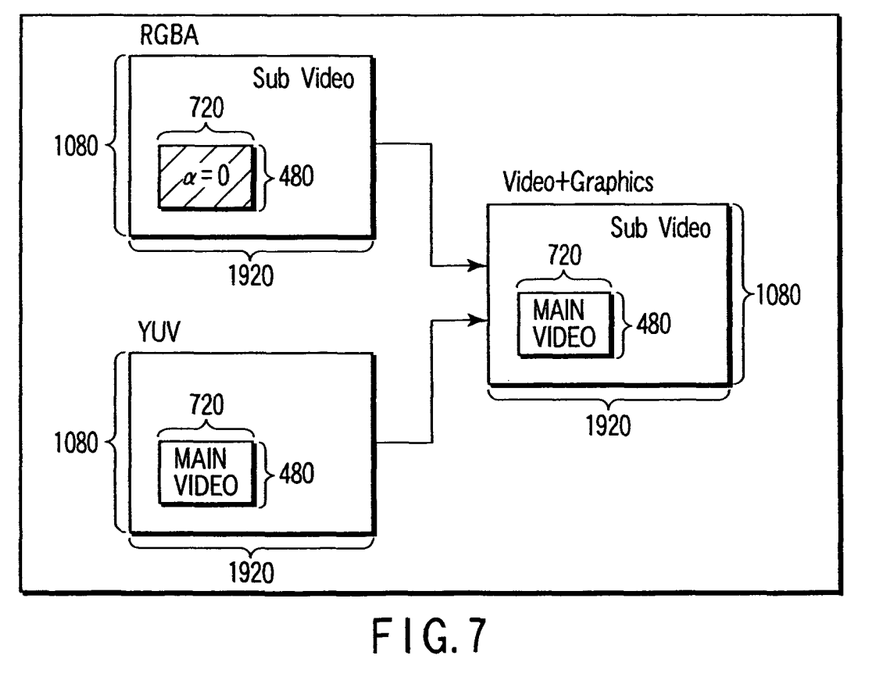
FIG. 7 is an exemplary diagram illustrating a state where main video data is displayed in a part of area on sub video data in the playback apparatus of FIG. 1.

Further, as shown in FIG. 7, main video data reduced to a resolution of 720×480 pixels can be displayed on an area on sub-video data enlarged to a resolution of 1920×1080 pixels.

The display mode of FIG. 7 is achieved by using a scaling function of the GPU 20 and a scaling function of the video decoder 25.

Specifically, in accordance with an instruction from the CPU 11, the GPU 20 performs scaling processing to increase the resolution of the sub-video data in a step-by-step manner until the resolution (image size) of the sub-video data reaches 1920×1080 pixels. The scaling processing is executed, using pixel interpolation. As the resolution of the sub-video data increases, an area where the sub-video data does not exist (the area having an alpha value of 0) gradually decreases in the graphics data of 1920×1080 pixels. Therefore, the size of the sub-video data displayed on the main video data gradually increases, and the area having an alpha value of 0 gradually decreases. When the resolution (image size) of the sub-video data reaches 1920×1080 pixels, the GPU 120 executes blending processing to superimpose a surface (color of pixels=black, alpha value of pixels=0) of 720×480 pixels on the sub-video data of 1920×1080 pixels, and thereby disposes an area of 720×480 pixels with an alpha value of 0 on the sub-video data of 1920×1080 pixels.

On the other hand, the video decoder 25 executes scaling processing to reduce the resolution of the main video data to 720×480 pixels, in accordance with an instruction from the CPU 11.

The main video data reduced to 720×480 pixels is displayed in the area of 720×480 pixels, with an alpha value of 0, disposed on the sub-video data of 1920×1080 pixels. Specifically, alpha data output from the GPU 120 can also be used as a mask to limit the area in which the main video data is displayed.

As described above, alpha data output from the GPU 120 can be controlled by software. Thereby, graphics data is effectively displayed in a state of being superimposed on main video data, and thereby highly interactive image display is easily realized. Further, alpha data is automatically transferred together with the graphics data from the GPU 120 to the blend processing unit 30, the software does not need to separately perform processing to transfer alpha data to the blend processing unit 30.

Figure 8:
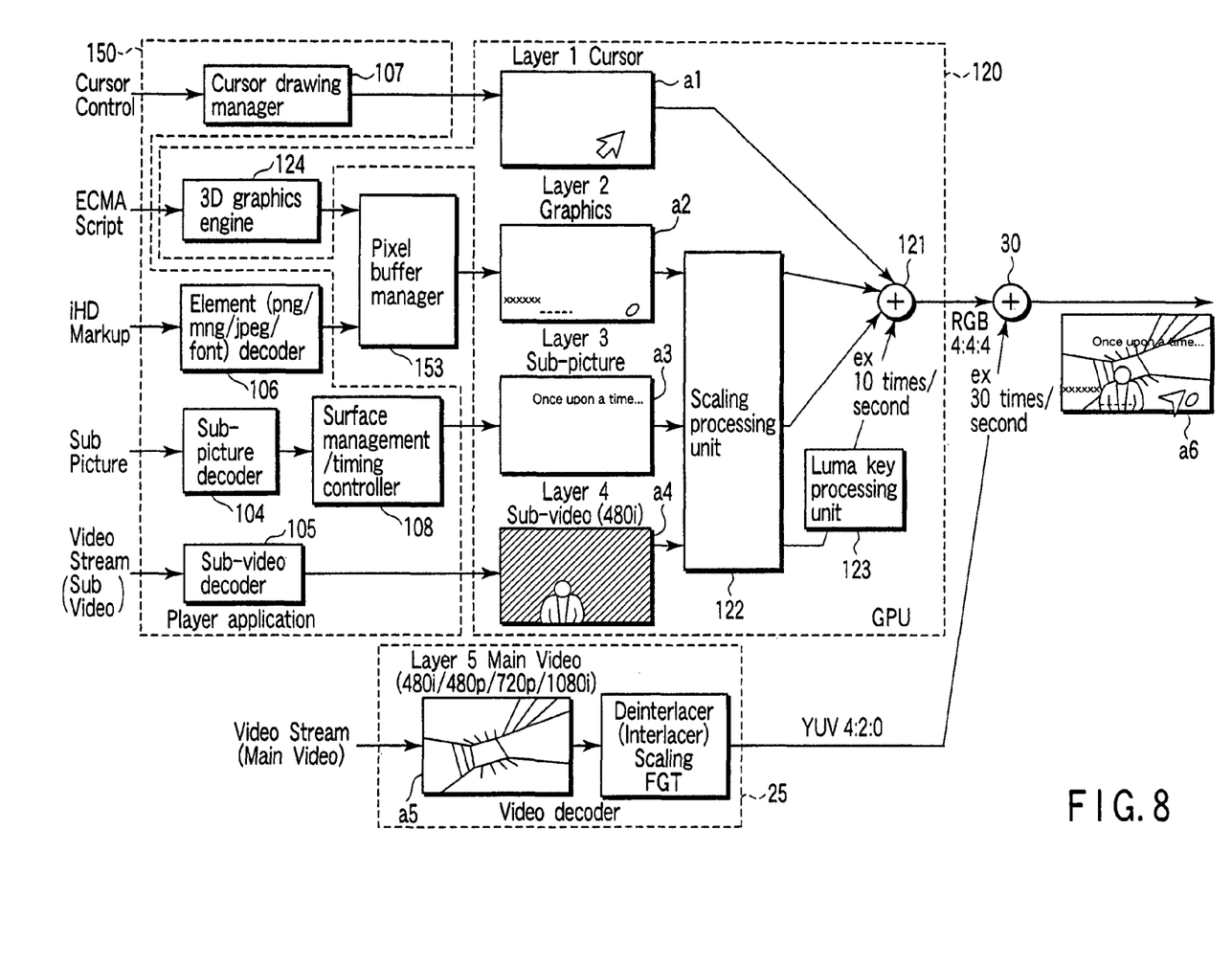
FIG. 8 is an exemplary conceptual diagram illustrating a processing for superimposing a plurality of image data items in AV content of the HD standard in the playback apparatus of FIG. 1.

FIG. 8 is a conceptual diagram illustrating a process of superimposing a plurality of image data items in HD standard AV content played back by the HD DVD player by the GPU 120 and the blend processing unit 30 operating as described above.

In the HD standard, five layers of Layer 1 to Layer 5 are defined, and the cursor, the graphics, the sub-picture, the sub-video, and the main video are assigned to Layers 1 to 5, respectively. As shown in FIG. 8, the MIX 121 of the GPU 120 superimposes four images a1 to a4 of Layers 1 to 4 among the Layers 1 to 5, as a former-step processing, and the blend processing unit 30 superimposes the image output from the GPU 120 and an image a5 of Layer 5, as a latter-step processing. Thereby, an object image a6 is generated.

As described above, the HD DVD player performs proper load distribution, as a first advantage, by separating superimposition of five image data items of Layers 1 to 5 defined in the HD standard into two steps. Further, the main video of Layer 5 comprises high-definition images, and update must be performed for each frame (there are 30 frames per second). Therefore, the blend processing unit 30 dealing with the main video is required to perform superimposition 30 times per second. In comparison with this, the cursor, the graphics, the sub-picture, and the sub-video of Layers 1 to 4 are not required to have an image quality as high as that of the main video. Therefore, it is enough for the MIX 121 of the GPU 120 to perform superimposition 10 times per second, for example. Supposing that the blend processing unit 30 executes superimposition of the cursor, the graphics, the sub-picture, and the sub-video of Layers 1 to 4 together with the main video of Layer 5, superimposition is performed 30 times per second also for Layers 1 to 4, that is, unnecessary superimposition is performed 20 times per second. Therefore, the HD DVD player properly achieves increase in efficiency, as a second advantage.

The cursor, the graphics, the sub-picture, and the sub-video of Layers 1 to 4 are supplied from the player application 150 to the GPU 120. To supply the image data items to the GPU 120, the player application 150 comprises the sub-picture decoder 104, the sub-video decoder 105, the graphics decoder (element decoder) 106, and a cursor drawing manager 107, and a surface management/timing controller 108, as shown in FIG. 8.

The cursor drawing manager 107 is realized as a function of the navigation control unit 201, and executes cursor drawing control to move the cursor in response to user's operation of the mouse device 171. On the other hand, the surface management/timing controller 108 executes timing control to display images of sub-picture data decoded by the sub-picture decoder 104 at a proper timing.

Cursor Control shown in FIG. 8 is control data for moving the cursor, which is generated by the USB controller 17 in response to operation of the mouse device 171. ECMA Script is a script in which a drawing API to instruct drawing of a point, a line, and a figure and the like is described. iHD Markup is text data described with a markup language to display various advanced elements at proper timings.

Further, the GPU 120 has a scaling processing unit 122, a luma key processing unit 123, and a 3D graphics engine 124, in addition to the MIX 121.

The scaling processing unit 122 executes the scaling processing mentioned in the explanation of FIG. 7. The luma key processing unit 123 executes luma key processing to remove the background (black) in the image by setting an alpha value of pixels, whose brightness value is less than a threshold value, to 0. The 3D graphics engine 124 executes graphics data generation processing, including image generation (of an image formed of a path of the cursor) for the drawing function.

As shown in FIG. 8, the HD DVD player performs scaling processing for images a2 to a4 of Layers 2 to 4, and further performs luma key processing for the image a4 of Layer 4. Further, in the HD DVD player, the GPU 120 does not execute the scaling processing and the luma key processing separately, but executes simultaneously with the blend processing (by the MIX 121). From the standpoint of the player application 150, the player application 150 requests the scaling processing and the luma key processing together with the blend processing. Suppose that the GPU 120 executes the scaling processing and the luma key processing separately, it is required to provide an intermediate buffer to temporarily store images after scaling processing and images after luma key processing, and perform data transfer between the intermediate buffer and the GPU 120. In comparison with this, according to the HD DVD player, in the GPU 120, output of the scaling processing unit 122 is input to the luma key processing unit 123 whenever necessary, and output of the luma key processing unit 123 is input to the MIX 121 whenever necessary. In other words, the HD DVD player performs a so-called pipeline processing in which the scaling processing unit 122, the luma key processing unit 123 and the MIX 121 work together. Therefore, the HD DVD player does not need an intermediate buffer, and does not generate data transfer between the intermediate buffer and the GPU 120. Also in this respect, the HD DVD player achieves increased efficiency.

A pixel buffer manager 153 illustrated in FIG. 8 is middleware, which performs assignment control of a pixel buffer used as a work area for drawing pictures by mouse operation using the 3D graphics engine 124 and drawing objects, such as operation guidance by the element decoder 106. The pixel buffer manager 153 is provided between a driver, which is prepared to use the pixel buffer being hardware by the software, and a higher system using the pixel buffer, to further optimize the assignment control by the driver.

As described above, in the HD DVD player, superimposition of five image data items of Layers 1 to 5 defined in the HD standard is separated into two steps, and thereby proper load distribution and increase in efficiency are achieved. Further, further increase in efficiency is achieved by executing the scaling processing and the luma key processing simultaneously with the blend processing.

Figure 9A:
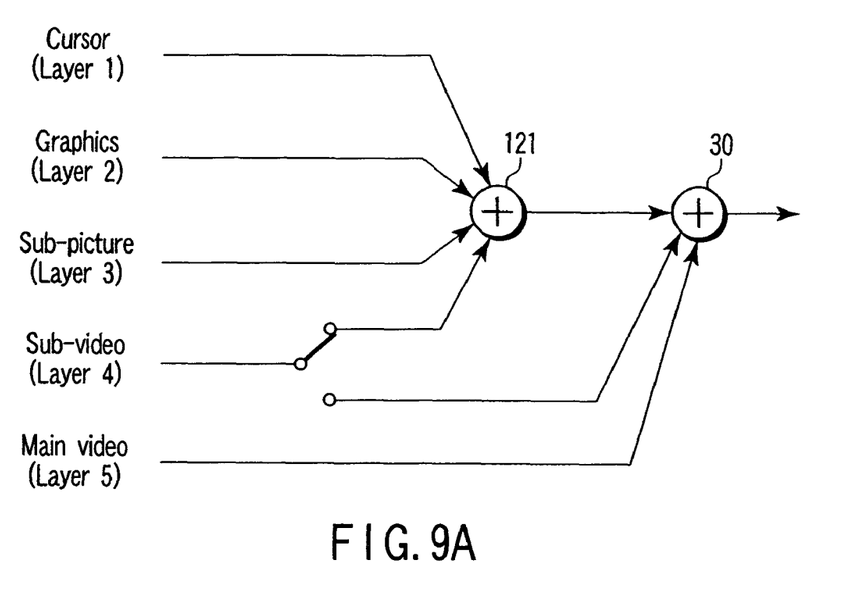
FIGS. 9A and 9B are diagrams illustrating an example of a structure for selectively executing superimposition of sub video images by one of the GPU and the blend processing unit in the playback apparatus of FIG. 1.
Figure 9B:
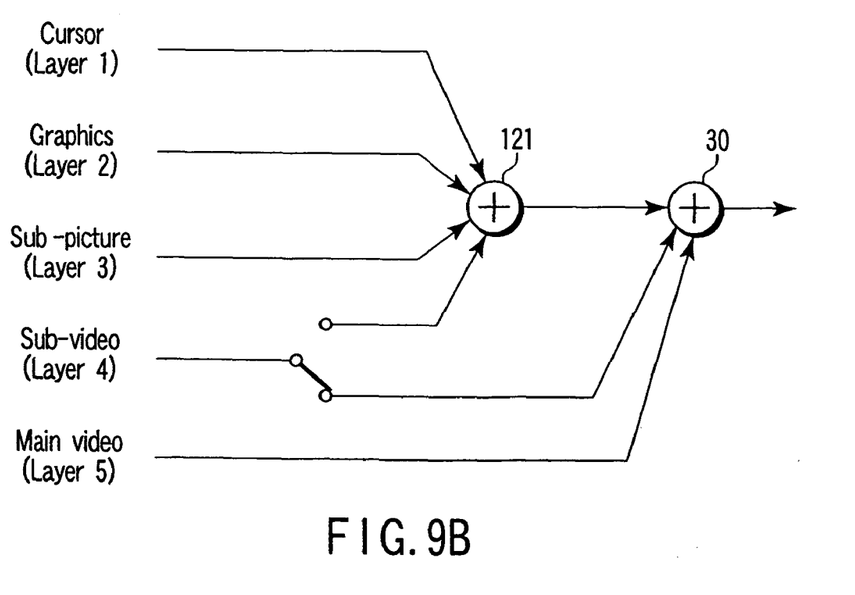

This embodiment shows an example of separation in which superimposition of images a1 to a4 of Layers 1 to 4 among the Layers 1 to 5 is performed as a former step, and superimposition of image a5 of Layer 5 is performed as a latter step. However, for example, superimposition of image a4 of Layer 4, that is, superimposition of the sub-video may be performed in either of the former and the latter steps, by dynamically switching connection of the Layer 4. FIGS. 9A and 9B are diagrams illustrating an example of a structure to selectively execute superimposition of the sub-video by either of the MIX 121 of the GPU 120 and the blend processing unit 30.

For example, if the sub-video is required to have a high image quality equal to the main video, and needs to be updated for each frame, that is, 30 times per second, switching from the state of FIG. 9A to the state of FIG. 9B may be performed. A trigger for the switching may be provided as a script included in the navigation data.

Further, it is possible to set the state of FIG. 9B as a basic state, and perform switching to the state of FIG. 9A when the HD DVD player becomes a heavy-load state exceeding a predetermined reference value. Since the player application 150 can obtain information of a load state from the OS 151, it is easy to obtain a trigger for switching.

Furthermore, in this embodiment, explained is the example in which the GPU 120 being software performs superimposition of the former step, and the blend processing unit 30 being hardware performs superimposition of the latter step. However, the essence of the present invention does not reside in separation of software processing and hardware processing. Therefore, the present invention is applicable as a matter of course to the case where both the former and the latter steps are performed by software processing.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A playback apparatus comprising:
    an output unit configured to output first video data, second video data, and picture data, the second video data and the picture data comprising first alpha data which includes a coefficient indicating the transparency or opacity of each pixel;
    a first blend processing unit configured to superimpose the second video data and the picture data, and to calculate second alpha data corresponding to each pixel in a region where the second video data and the picture data are superimposed by using the first alpha data corresponding to each pixel in the region included in the second video data and the first alpha data corresponding to each pixel in the region included in the picture data; and
    a second blend processing unit configured to superimpose the superimposed data obtained by the first blend processing unit and the first video data, the superimposed data comprising the second alpha data,
    wherein the first blend processing unit is configured to output, to a dedicated bus, the second alpha data and the superimposed data in synchronization with each other pixel by pixel, the dedicated bus connecting the first blend processing unit and the second blend processing unit.

2. A playback apparatus according to claim 1, further comprising:
    a switch unit configured to switch superimposition of the second video data from the first blend processing unit to the second blend processing unit.

3. A playback apparatus according to claim 2, further comprising:
    a control unit configured to drive and control the switch unit to cause the second blend processing unit to perform superimposition of the second video data when the image quality of the second video data is equal to the image quality of the first video data, and to cause the first blend processing unit to perform superimposition of the second video data when the image quality of the second video data is lower than the image quality of the first video data.

4. A playback apparatus according to claim 2, further comprising:
    a control unit configured to drive and control the switch unit to cause the second blend processing unit to perform superimposition of the second video data when the playback apparatus is under light load, and to cause the first blend processing unit to perform superimposition of the second video data when the playback apparatus is under heavy load.

5. A playback apparatus according to claim 1, wherein the first blend processing unit performs scaling processing to reduce or enlarge the picture data, simultaneously with performing the blend processing.

6. A playback apparatus according to claim 1, wherein the first blend processing unit performs scaling processing to reduce or enlarge the second video data, simultaneously with performing the blend processing.

7. A playback apparatus according to claim 6, wherein the first blend processing unit performs luma key processing for the second video data to remove a background color in the second video data, simultaneously with performing the blend processing.

8. A playback apparatus according to claim 1, wherein the first blend processing unit performs luma key processing for the second video data to remove a background color in the second video data, simultaneously with performing the blend processing.

9. A playback method using a playback apparatus comprising:
    outputting first video data, second video data, and picture data, the second video data and the picture data comprising first alpha data which includes a coefficient indicating the transparency or opacity of each pixel;
    first superimposing the second video data and the picture data, calculating second alpha data corresponding to each pixel in a region where the second video data and the picture data are superimposed by using the first alpha data corresponding to each pixel in the region included in the second video data and the first alpha data corresponding to each pixel in the region included in the picture data, and outputting, to a dedicated bus, the second alpha data and the superimposed data in synchronization with each other pixel by pixel, the superimposed data comprising the second alpha data; and
    second superimposing the superimposed data and the first video data.

10. The playback apparatus according to claim 1, wherein a number of times of processing per unit time performed by the first blend processing unit is smaller than a number of times of processing per unit time performed by the second blend processing unit.

* * * * *